United States Patent [19]

Achar et al.

[11] Patent Number: 4,522,755
[45] Date of Patent: Jun. 11, 1985

[54] METAL PHTHALOCYANINE INTERMEDIATES FOR THE PREPARATION OF POLYMERS

[75] Inventors: Bappalige N. Achar, Mysore, India; George M. Fohlen, Millbrae; John A. Parker, Los Altos, both of Calif.

[73] Assignee: The United States of America as represented by the United States National Aeronautics and Space Administration, Washington, D.C.

[21] Appl. No.: 514,117

[22] Filed: Sep. 15, 1983

Related U.S. Application Data

[62] Division of Ser. No. 415,880, Sep. 8, 1982, Pat. No. 4,456,268.

[51] Int. Cl.$^3$ ............................................ C07D 487/22
[52] U.S. Cl. ............................ 260/245.75; 260/245.9; 528/327
[58] Field of Search ..................... 260/245.75, 245.9

[56] References Cited

FOREIGN PATENT DOCUMENTS

57-25361  2/1982  Japan ............................... 260/245.9

OTHER PUBLICATIONS

Moser et al., "Phthalocyanine Compounds", (Reinhold), (1963), pp. 104–141.

*Primary Examiner*—Robert T. Bond
*Attorney, Agent, or Firm*—Darrell G. Brekke; John R. Manning; Robert D. Marchant

[57] ABSTRACT

Metal 4, 4', 4", 4'''-tetracarboxylic phthalocyanines (MPTC) are prepared by reaction of trimellitic anhydride, a salt or hydroxide of the desired metal (or the metal in powdered form), urea and a catalyst. A purer form of MPTC is prepared than heretofore. These tetracarboxylic acids are then polymerized by heat to sheet polymers which have superior heat and oxidation resistance. The metal is preferably a divalent metal having an atomic radius close to 1.35Å.

5 Claims, 3 Drawing Figures

M = Cu, Co, Ni, ...

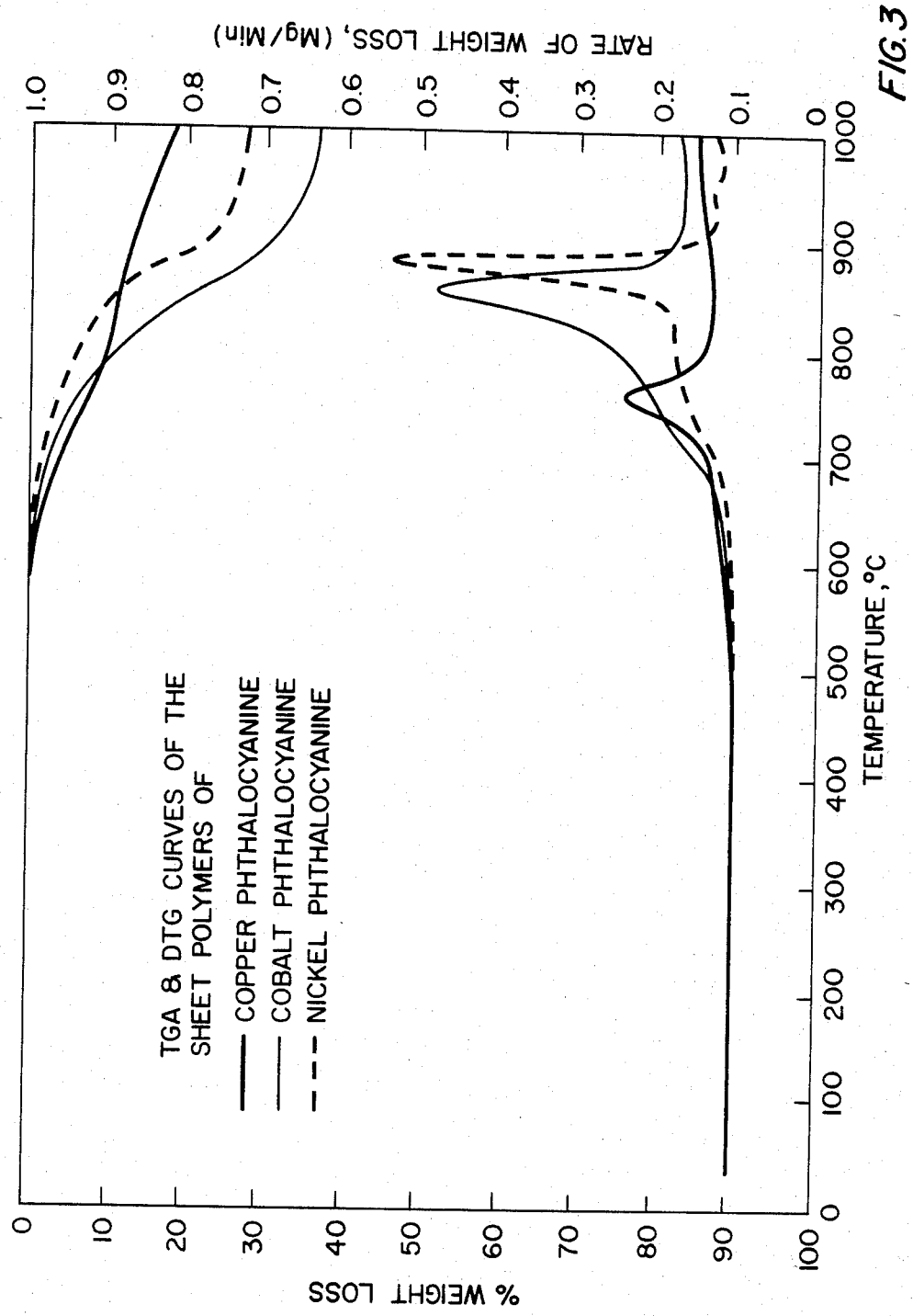

METAL PHTHALOCYANINE INTERMEDIATES FOR THE PREPARATION OF POLYMERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This is a division of application Ser. No. 415,880 filed Sept. 8, 1982, now U.S. Pat. No. 4,456,268, granted May 22, 1984.

FIELD OF THE INVENTION

This invention relates to metal phthalocyanine tetracarboxylic acids, to a novel method of synthesizing the same and to polymers of the same.

BACKGROUND OF THE INVENTION

In recent years there has been an increasing demand in industry and defense for polymeric substances which would either remain intact or continue to serve in a more or less degraded state under conditions where temperatures far above the ordinary are encountered. In many cases highly cross-linked organic polymers have been found promising. The phthalocyanine structure is one of the most thermally stable organic structures known. Attractive properties like resistance to chemical attack, electrical properties, catalytic activity and moderate cost of manufacture with good coloring properties have made phthalocyanines the object of intensive world-wide investigations. Many attempts to synthesize polymers based on phthalocyanines have failed to provide the expected thermal stability. Phthalocyanine polymers so far produced have shown less thermal stability than the phthalocyanine monomer itself because of the presence of impurities, weak chemical bonds and low degree of polymerization with structural inhomogeneity. Impurities have the considerable effect of decreasing thermal stability of the phthalocyanine monomers as well as the polymers produced from them. It is well known that the way in which the repeating units are linked is reflected in the properties of the polymers. If the repeating phthalocyanine mer units are linked in the way phenyl groups are linked in biphenyl, the conjugation extends throughout the macromolecule thereby increasing the extent of delocalization of the $\pi$-electrons. This is expected to increase the conductivity as well as the thermal stability of the phthalocyanine polymers.

OBJECTS OF THE INVENTION

Objects of the invention include methods of preparing metal phthalocyanine monomers in a pure state and the preparation from such monomers of thermally stable sheet polymers which have biphenyl type linkages between the mer units, high thermal and thermal oxidative stability and electrical conductivity, also good flame and fire resistance.

BRIEF DESCRIPTION OF THE INVENTION

A metal phthalocyanine tetracarboxylic acid (MPTC) is prepared in pure form by reaction of trimellitic anhydride with urea and a soluble metal salt in the presence of a suitable catalyst and in a suitable solvent. The metal is that which it is desired to introduce into the intended metal complex. The resulting MPTC, after separation and purification, is polymerized by heat in a vacuum or in an atmosphere of an inert gas such as nitrogen. The MPTC prepared by this method is purer than MPTC's prepared heretofore and the polymer derived from it is free of impurities which detract from its useful properties.

DESCRIPTION OF THE DRAWINGS

FIG. 3 is a graph showing TGA and DTG curves for these polymers, including the polymer of FIG. 2.

DETAILED DESCRIPTION OF THE INVENTION

EXAMPLE 1

Figure 1:
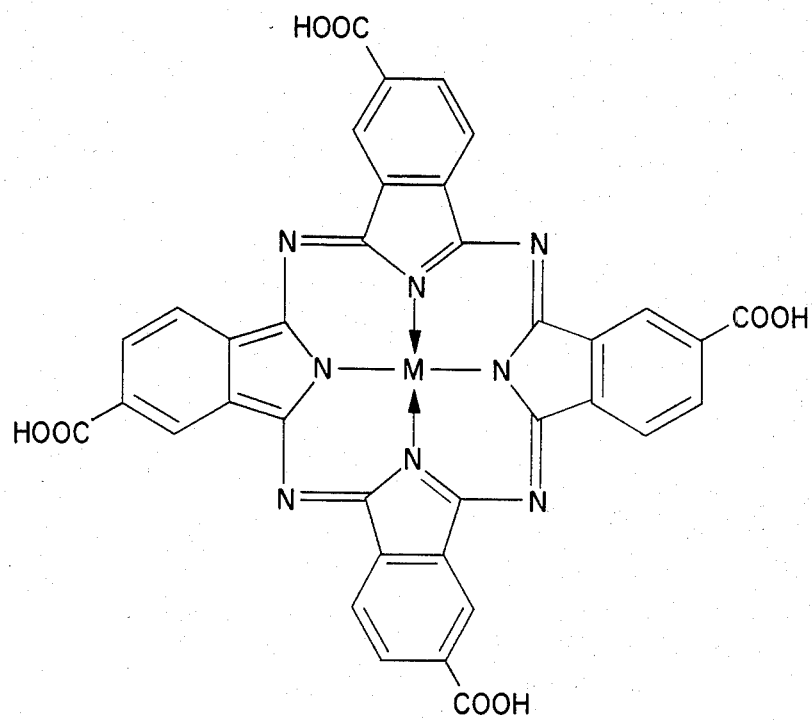
FIG. 1 is a structural formula of the metal 4,4',4'',4'''-tetracarboxy phthalocyanine which is to be polymerized.
Figure 2:
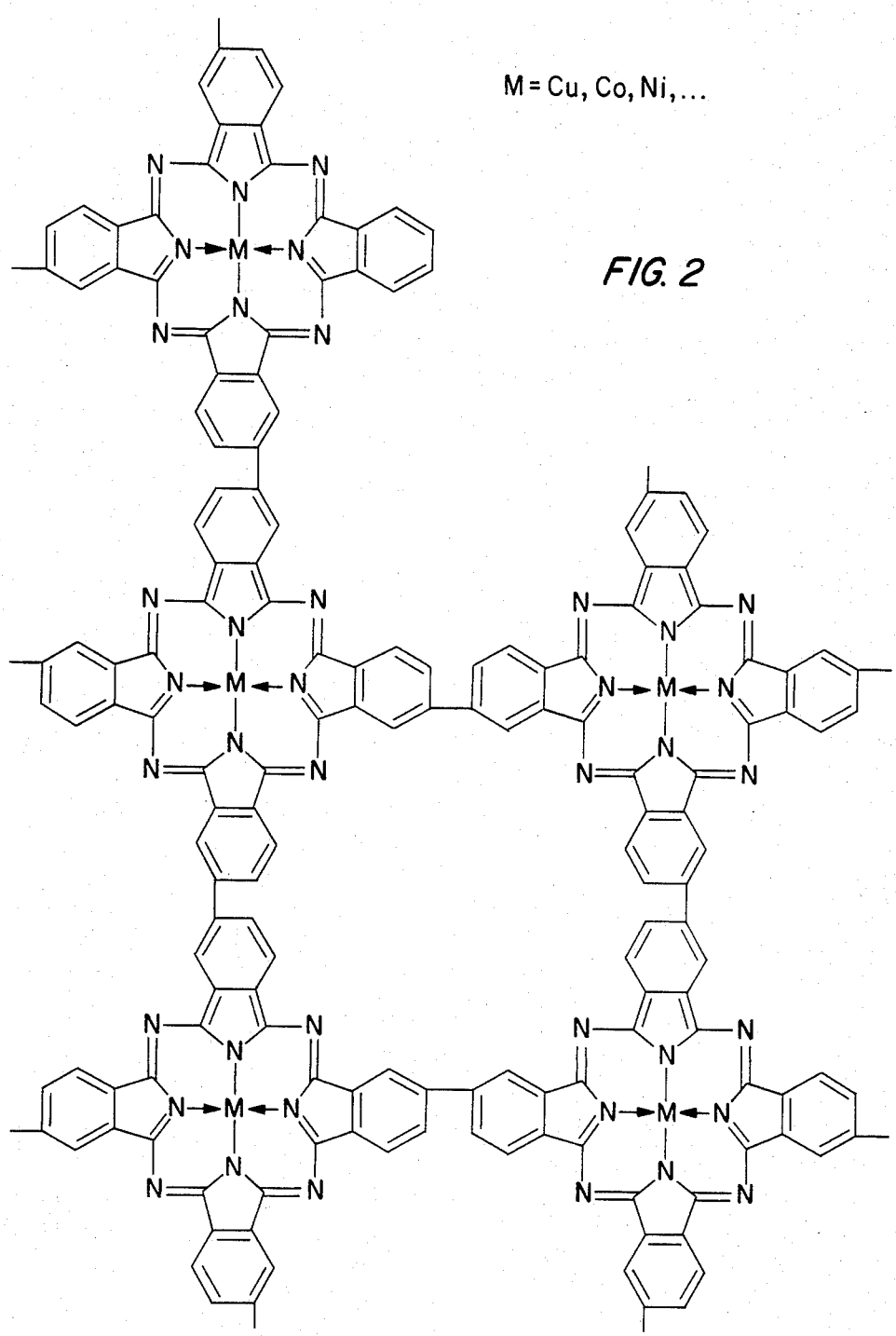
FIG. 2 is a structural formula of the resulting polymer.

Preparation of Copper (II) phthalocyanine tetracarboxylic acid 1

This compound has the formula

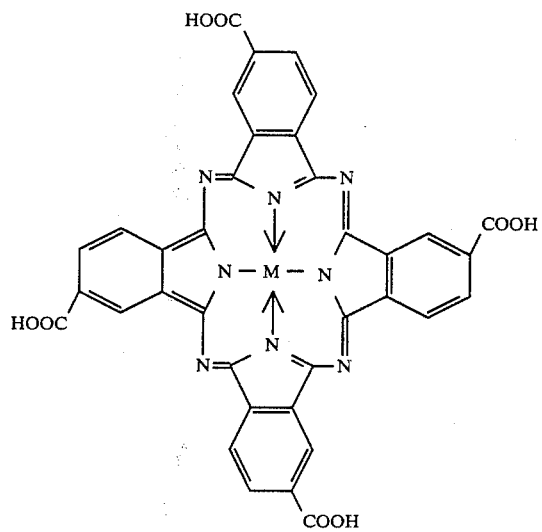

wherein M is copper (II).

It was prepared as follows: 12.0 g Copper (II) sulfate pentahydrate, 33.8 g trimellitic anhydride, 4.5 g ammonium chloride, 0.5 g ammonium molybdate and 60 g urea were finely ground together and placed in a 500 ml three-necked flask containing 25 ml of nitrobenzene. The flask was provided with a thermometer, condenser and a mechanical stirrer. The temperature of the flask was slowly increased to 180° C. and maintained at 185° C. for four hours. The color of the reaction mixture gradually deepened and finally a deep colored solid was obtained. The product was ground well and washed with methanol until it was free from nitrobenzene. The solid product was added to 500 ml of 1.0N hydrochloric acid saturated with sodium chloride, boiled briefly, cooled to room temperature and filtered. The resulting solid material was treated with 500 ml of 2.0N sodium hydroxide containing 200 g sodium chloride and heated at 90° C. until the evolution of ammonia ceased. The solution after filtration was treated with 500 ml 2.0N hydrochloric acid and the product was separated by centrifugation. The residue was redissolved in 0.1N sodium hydroxide and filtered to separate the insoluble materials. The compound was re-precipitated with 1.0N hydrochloric acid and centrifuged to obtain the solid material. Dissolution and precipitation steps were repeated twice. Then the compound was washed until chloride free and finally washed with methanol. The blue product was dried at 100° in vacuum.

Compound $C_{36}H_{16}N_8O_8Cu$, (CuPTC): Calcd: C, 57.5; H, 2.14; N, 14.9; Cu, 8.45; Eq. wt. 188.0. Found: C, 57.1; H, 2.3; N, 15.0; Cu, 8.5; Eq. wt. 187.6. IR absorption bands (cm$^{-1}$): 3500–2500 (broad), 1691 (broad), 1614m, 1578m, 1508m, 1329m, 1279m, 1246m (broad), 1188m, 1149m, 1089s, 1050w, 968w, 940w, 851w, 783w, 774w, 736s.

EXAMPLES 2 AND 3

The cobalt and nickel analogues of 1 were prepared by the same method using in Example 2 cobalt sulfate and in Example 3 nickel sulfate. The empirical formulae and analytical results obtained were as follows:

Example 2 (Cobalt)

Compound $C_{36}H_{16}N_8O_8Co$, (CoPTC): Calcd: C, 57.8; H, 2.15; N, 15.0; Co, 7.88; Eq. wt. 186.9. Found: C, 57.5; H, 2.2; N, 15.2; Co, 7.90; Eq. wt. 186.7. IR absorption bands (cm$^{-1}$): 3500–2500 (broad), 1696 (broad), 1613m, 1586m, 1521m, 1330m, 1281m, 1246m, (broad), 1189m, 1149m, 1090s, 1050w, 9730w, 944w, 848w, 782w, 773w, 742s.

Example 3 (Nickel)

Compound $C_{36}H_{16}N_8O_8Ni$, (NiPTC): Calcd: C, 57.86; H, 2.15; N, 15.0; Ni, 7.86; Eq. wt. 186.8. Found: C, 57.91; H, 2.2; N, 15.05; Ni, 7.88; Eq. wt. 186.6. IR absorption bands (cm$^{-1}$) 3500–2500 (broad), 1699 (broad), 1615m, 1590m, 1530m, 1333m, 1274m, 1238m (broad), 1189m, 1150m, 1089s, 1050w, 976w, 944w, 848w, 779w, 738s.

Any mono-, di- or higher valency metal M may be used in place of divalent copper, cobalt and nickel, e.g., Cu(I), cobalt and nickel in other valence states, Fe(II), Fe(III), Zn, Al, lead, tin, palladium, germanium, vanadium, platinum and molybdenum in various valence states; monovalent metals such as Li, Na and K, etc. Where the metal is monovalent two atoms will be present, one atom above and the other atom below the plane of the phthalocyanine molecule. With a trivalent metal such as aluminum, one of the valences may be satisfied by a ligand such as Cl, F, acetate, etc., e.g., the metallic compound can be represented as M' where M' is the metal atom and X is an inorganic atom or radical or an organic group.

Preferably the metal is divalent and has an atomic radius close to 1.35 Å. Metals of substantially larger atomic radius may not fit well into the molecule and metals having a substantially smaller atomic radius are more likely to be extracted by strong acids, e.g., concentrated sulfuric acid. Metals having ligands may be susceptible to hydrolytic action.

Any soluble salt or hydroxide of the selected metal may be used provided the counter ion is compatible with the reactants and the reaction product. For example, the metal M may be used in the form of its sulfate, chloride, nitrate, acetate, oxalate, etc. Also, it may be used in the form of a finely divided metallic powder. Preferably the reactants are used in approximately stoichiometric proportions. The reactants are trimellitic anhydride

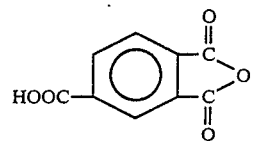

(which provides the benzenoid rings), urea and possibly also the ammonium chloride. The ammonium chloride may be used alone as the catalyst but the use of ammonium molybdate as well allows the reaction to proceed at a lower temperature and increases the yield.

Nitrobenzene is an advantageous solvent because, besides being unreactive and being a good solvent for the reactants, it has a high boiling point (210° C.). Other aprotic solvents such as quinoline and tetralin may be used. Yields of 90% or more are obtainable.

The metal M may be removed from the molecule as by dissolving it in concentrated sulfuric acid to produce the hydrogen (protonated) species in which each of the two covalent bonds is connected to hydrogen. The protonated species may then be treated with an alcoholic solution of a metal salt, e.g., copper sulfate, to insert the metal, e.g., Cu(II). In this way one metal may be substituted for another. However, it is preferred to choose the desired metal initially and to insert it in the phthalocyanine molecule in the synthesis of the tetracarboxylic acid.

EXAMPLE 4

Polymerization of MPTC—Method 1

About 1–2 g of metal phthalocyanine tetracarboxylic acid was finely ground in a small vibrating ball mill and placed in a polymerization tube. The tube was connected to an apparatus provided with a tube to condense volatile products, stopcocks to connect gas collection tube and IR cell for gaseous analysis. The apparatus was connected to vacuum system. Reaction tube was carefully evacuated to $10^{-5}$–$10^{-6}$ torr pressure and heated to 450° C. The gaseous and volatile products were condensed in separate traps using liquid nitrogen. The reaction was found to be completed after one hour of heating at 450° C. in vacuum.

EXAMPLE 5

Polymerization of MPTC—Method 2

Finely ground metal phthalocyanine tetracarboxylic acid was taken in a reaction tube fitted with a glass enclosed iron-constantan thermocouple and inlet and outlet tubes. The polymerization tube was carefully purged with nitrogen by repeated evacuation and refilling. Then it was gradually heated to 450° C. in a current of nitrogen and maintained temperature of 450°–500° C. in a current of nitrogen for one hour.

Methods 1 and 2 were applied to produce the divalent copper, cobalt and nickel compounds. Analytical results were the same for products of the two methods and were as follows:

(1) Compound $C_{32}H_{12}N_8Cu$: Calcd: C, 67.18; H, 2.11; N, 19.58; Cu, 11.2. Found: C, 66.9; H, 2.21; N, 19.8; Cu, 11.5. IR absorption bands (cm$^{-1}$): 1610w, 1503w, 1407w, 1328m, 1271m, 1164m, 1118w, 1089m, 1065m, 898w, 773w, 754w, 738s.

(2) Compound $C_{32}H_{12}N_8Co$: Calcd: C, 67.73; H, 2.13; N, 19.75; Co, 10.39. Found: C, 67.6; H, 2.3; N, 19.95; Co, 10.46. IR absorption bands (cm$^{-1}$): 1599w, 1502w, 1408w, 1329m, 1292m, 1115w, 1090m, 1060w, 940w, 902w, 785w, 740w, 741s.

(3) Compound $C_{32}H_{12}N_8Ni$: Calcd: C, 67.76; H, 2.13; N, 19.75; Ni, 10.35. Found: C, 67.8; H, 2.18; N, 19.92; Ni, 10.43. IR absorption bands ($cm^{-1}$): 1602w, 1519w, 1409w, 1334m, 1287m, 1157m, 1115w, 1086m, 1053w, 944w, 914w, 782w, 745w, 743m.

The polymerization reaction proceeds by way of the elimination of carboxyl groups and the formation of a sheet polymer in which the mer units are linked by biphenyl linkage. The formula of the polymer may be expressed as follows:

These polymers are soluble in concentrated (98%) sulfuric acid, concentrated (36%) hydrochloric acid, chlorosulfuric acid and trimethyl sulfonic acid. They have high thermal resistance and have a higher electrical conductivity (as well as a higher thermal oxidative resistance) than the phthalocyanine monomers. Threshold temperatures at which major decomposition occurs are typically higher than 450° C. in air; they have a high char yield in nitrogen and in nitrogen atmosphere no catastrophic decomposition has been observed up to 1000° C. Char yields at 800° C. in nitrogen and electric conductivities are given in Table I.

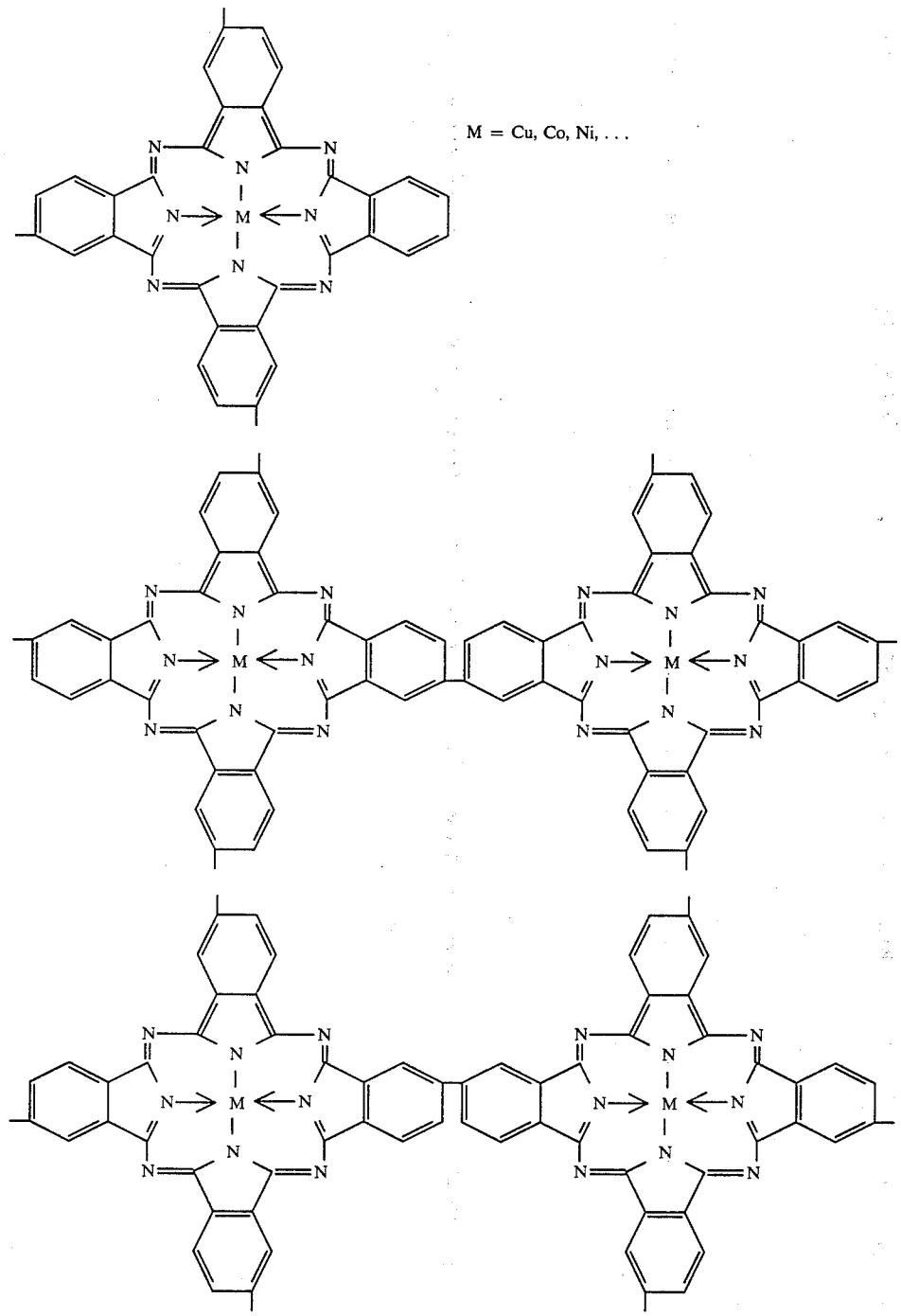

M = Cu, Co, Ni, ...

TABLE 1

| POLYMER | PDT$_{max}$ °C. | CHAR YIELD (800° C.) | CONDUCTIVITY (22–300° C.) (Ω-cm) |
|---|---|---|---|
| CuPc-Sheet Polymer | 760 | 90.5% | $3.2 \times 10^{-10}$–$3.8 \times 10^{-5}$ |
| CoPC-Sheet Polymer | 860 | 89.0% | $1.8 \times 10^{-8}$–$2.3 \times 10^{-3}$ |
| NiPc-Sheet Polymer | 890 | 93.0% | $1.4 \times 10^{-8}$–$3.9 \times 10^{-5}$ |

In FIG. 3 of the drawing the results plotted are for Cu, Co and Ni sheet polymers heated in an atmosphere of nitrogen. The ordinate scale on the left represents percent decomposition and the ordinate scale on the right represents rate of weight loss. As will be seen the polymers did not undergo substantial decomposition below 750° C. to 800° C. (See curves at top.) The rate of decomposition (lower set of curves) did not become substantial until about 750° to 900° C.

It will be apparent that purer metal phthalocyanine tetracarboxylic acids are provided, that a new and useful method of preparing them has been provided and that new and useful polymers and methods of producing them have been provided.

It is claimed:

1. A method of preparing an isolated metal 4,4′,4″,4‴-tetracarboxylic phthalocyanine which comprises
   a. heating at about 185° C. for about four hours a reaction mixture comprising an anhydride consisting essentially of trimellitic anhydride, a source of metal selected from finely divided powders and salts of said metal, and urea in the presence of a catalyst comprising ammonium chloride and ammonium molybdate in a nitrobenzene reaction medium, and
   b. recovering the desired metal 4,4′,4″,4‴-tetracarboxylic phthalocyanine from the reaction mixture by,
      b.1. washing the reaction mixture with methanol to give a washed product,
      b.2. boiling the washed product in aqueous mineral acid to give an acid-wash product,
      b.3. treating the acid wash product with inorganic hydroxide at elevated temperature until ammonia evolution ceases and a soluble product results,
      b.4. precipitating the desired metal 4,4′,4″,4‴-tetracarboxylic phthalocyanine as a solid from the soluble product, and
      b.5. isolating and washing the solid metal 4,4′,4″,4‴-tetracarboxylic phthalocyanine with methanol and drying.

2. The method of claim 1 wherein the metal is a divalent metal having an atomic radius of approximately 1.35 Å.

3. The method of claim 2 wherein the metal is copper and the source of metal is a copper salt.

4. The method of claim 2 wherein the metal is nickel and the source of metal is a nickel salt.

5. The method of claim 2 wherein the metal is cobalt and the source of metal is a cobalt salt.

* * * * *

UNITED STATES PATENT OFFICE
CERTIFICATE OF CORRECTION

Patent No. 4,522,755          Dated June 11, 1985

Inventor(s) B.N. Achar, G.M. Fohlen and J.A. Parker

It is certified that error appears in the above-identified patent and that said Letters Patent are hereby corrected as shown below:

First page, line [22], change "Sep. 15, 1983" to --July 15, 1983--.

First page, line [62], change "Pat. No. 4,456,268" to --Pat. No. 4,450,268--.

Column 1, line 12, delete "4,456,268" and insert --4,450,268--.

Signed and Sealed this

First Day of October 1985

[SEAL]

Attest:

DONALD J. QUIGG

Attesting Officer

Commissioner of Patents and
Trademarks—Designate